United States Patent Office 3,437,347
Patented Apr. 8, 1969

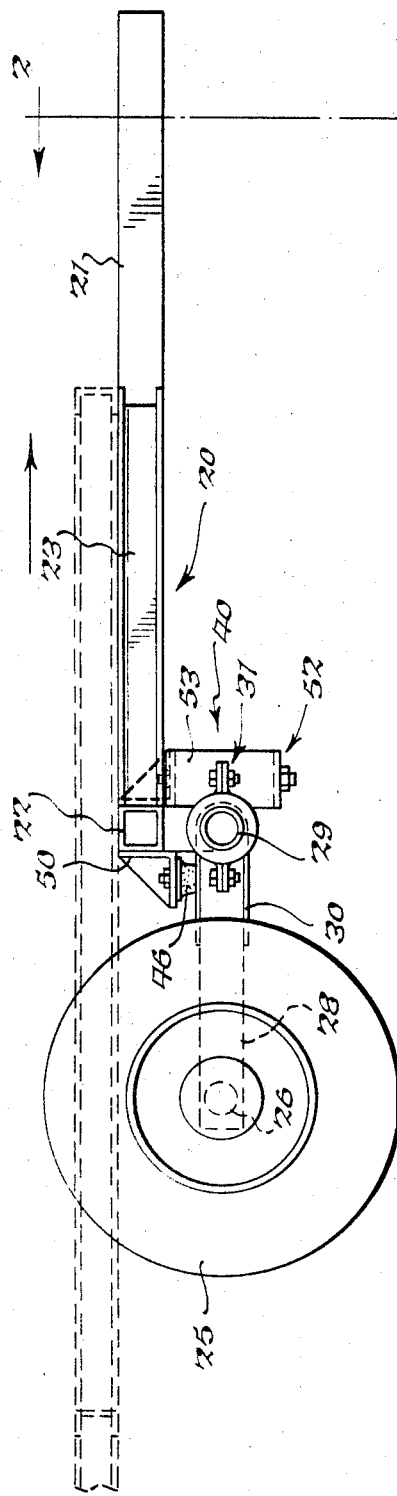
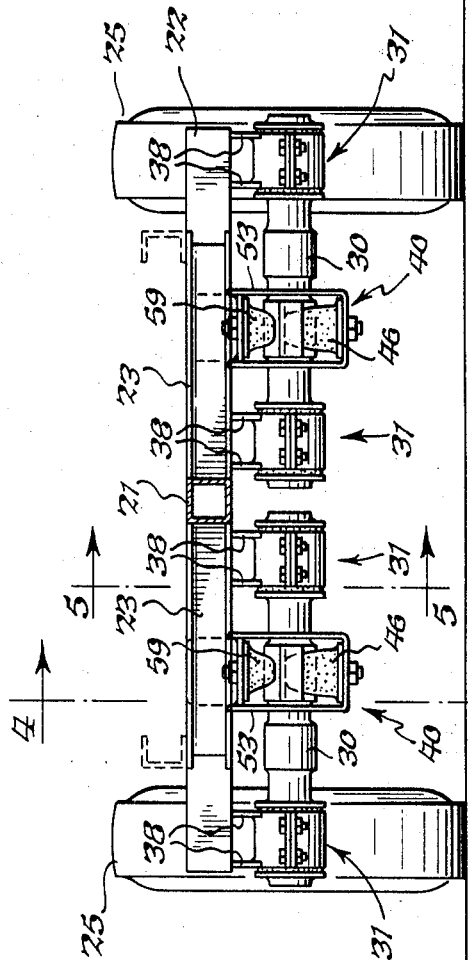

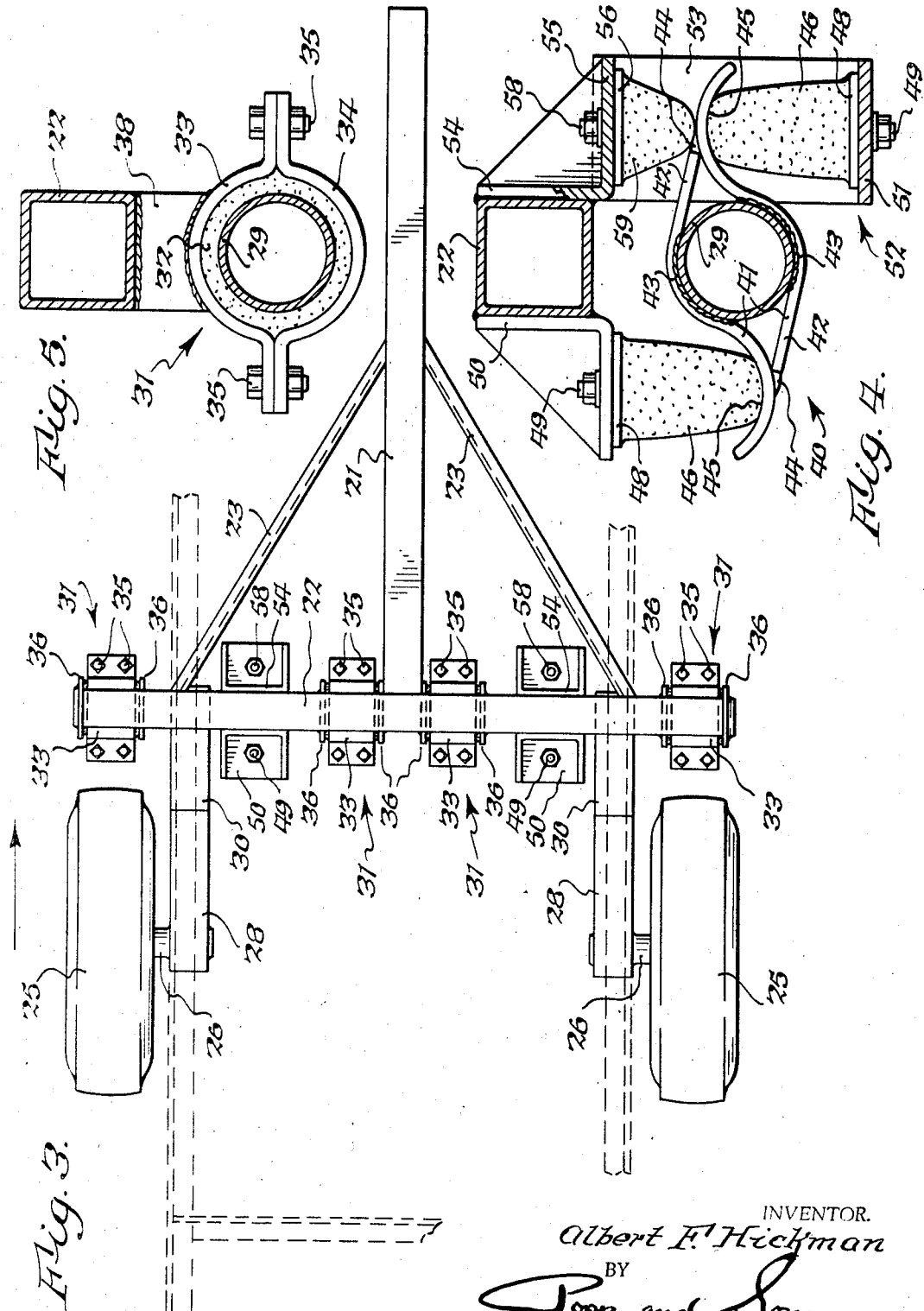

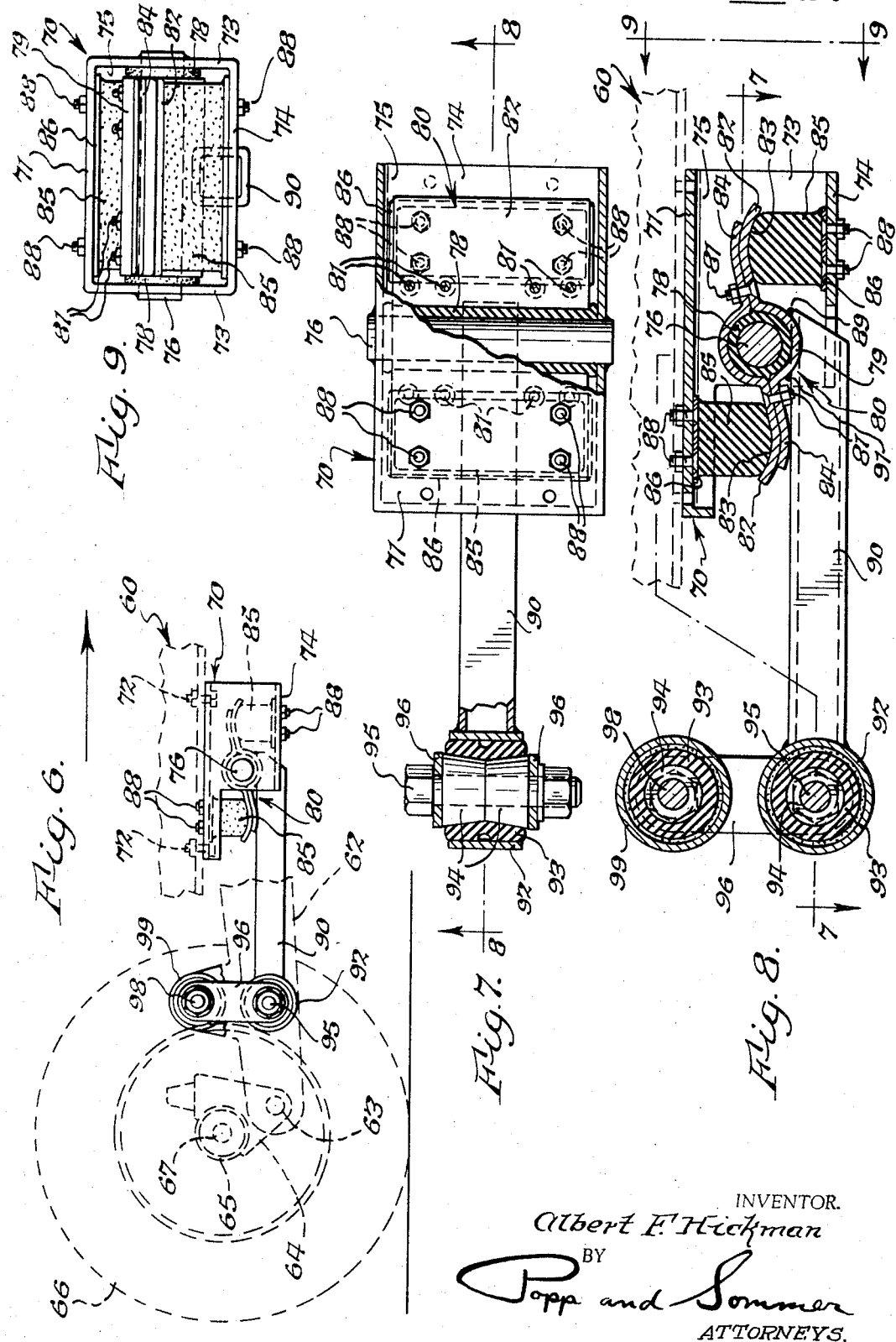

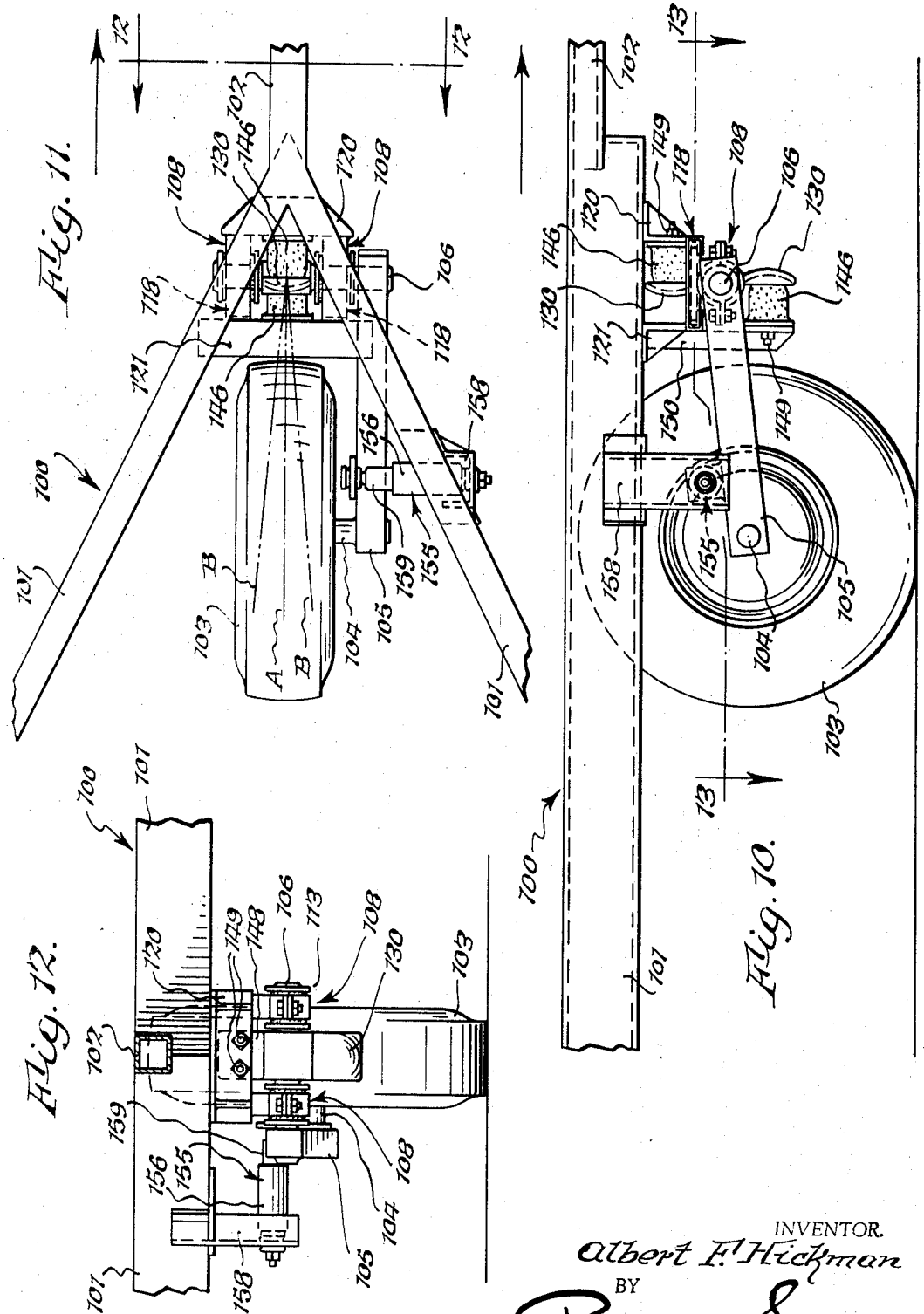

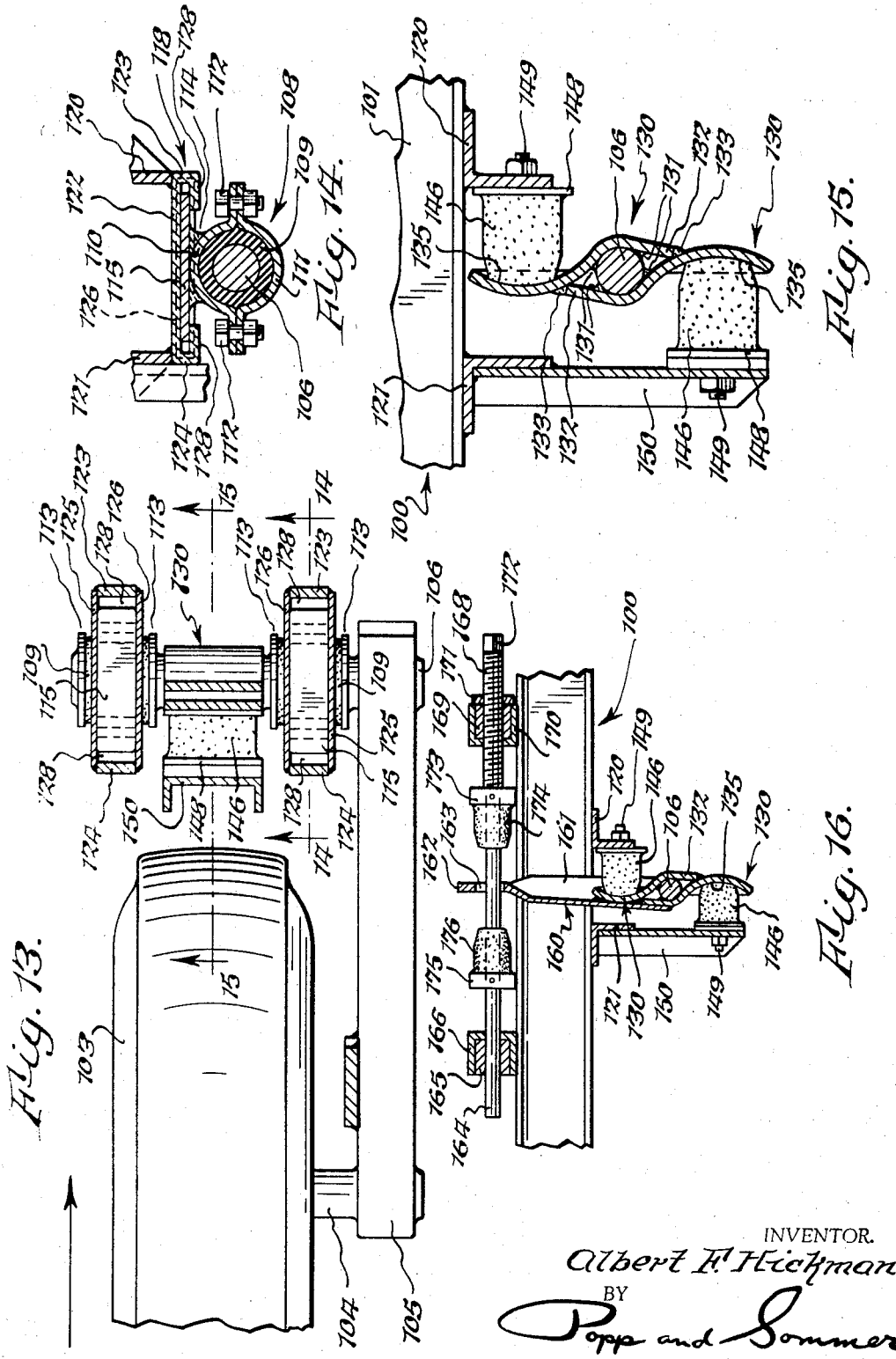

3,437,347
VEHICLE SPRING SUSPENSION
Albert F. Hickman, Eden, N.Y., assignor to Grimar, Inc., Clinton, Mass.
Continuation-in-part of applications Ser. No. 484,849, Sept. 3, 1965, and Ser. No. 591,899, Nov. 3, 1966.
This application Apr. 10, 1967, Ser. No. 629,546
Int. Cl. B60g 11/42
U.S. Cl. 280—124                                  10 Claims

ABSTRACT OF THE DISCLOSURE

While not limited to any specific service, the suspension is shown between a vehicle frame and one of its supporting wheels, the wheel rotatably supporting an axle, and the axle supporting the free end of an arm, in turn fixed to a hub member or cross shaft journalled on the frame. Short arms project from diametrically opposite sides of the hub member and compressively bear with touching contact against the ends of the major axes of a pair of elongated resilient rubber bodies fixed to the frame and which are substantially symmetrical on opposite sides of their major axes. The back pressures of the bodies so compressed tend to balance each other to avoid corner loading of the hub member bearings and provide a very simple, friction free resilient support for the frame. A rubber body acting against rebound movement of the short arms can be provided, and the suspension is particularly adapted for a self-steering or caster wheels by the interposition of fore-and-aft movable slide members between end bearings journalling the ends of the hub member. If desired, the loading of the rubber bodies can be adjustable.

*Continuation-in-part*

This application is a continuation-in-part of my copending application Ser. No. 591,899, filed Nov. 3, 1966 for Spring suspension which in turn is a continuation-in-part of my application Ser. No. 484,849, filed Sept. 3, 1965, now Patent No. 3,298,711 dated Jan. 17, 1967.

*Summary of invention*

The invention resides in the balanced and, if desired, adjustable, action of two elongated resilient rubber bodies under compression substantially exclusively along their major axes between the outboard end of arms of a cross shaft or hub member and fixed brackets, each body being symmetrical on opposite sides of its axis so that equal expansion and contraction of such opposite sides provides the resilient support; the use of an additional resilient rubber body to cushion rebound forces; and when used as a dolly, rendering the dolly wheel self-steering by the use of slide members as above described.

FIG. 1 is a side elevational view of a light duty trailer, such as a boat trailer, supported by a spring suspension embodying the present invention. FIG. 2 is a front elevational view thereof, this being taken from line 2—2, FIG. 1. FIG. 3 is a top plan view thereof. FIGS. 4 and 5 are enlarged vertical longitudinal sections taken on the correspondingly numbered lines of FIG. 2. FIG. 6 is a side elevational view of an auxiliary spring suspension designed primarily for use with light duty pickup trucks when used to support the weight of a camper body in trailer travel. FIG. 7 is an enlarged horizontal section taken generally on line 7—7, FIG. 8. FIG. 8 is a vertical longitudinal section taken generally on line 8—8, FIG. 7. FIG. 9 is a front elevational view taken from line 9—9, FIG. 8. FIG. 10 is a side elevational view of a dolly used to support the front end of a family travel trailer which otherwise would have its entire front end weight supported on a ball carried by a family automobile. FIG. 11 is a fragmentary top plan view thereof. FIG. 12 is a front elevational view thereof, viewed from line 12—12, FIG. 11. FIG. 13 is an enlarged horizontal section taken generally on line 13—13, FIG. 10. FIG. 14 is a vertical longitudinal section taken on line 14—14, FIG. 13. FIG. 15 is a vertical longitudinal section taken on line 15—15, FIG. 13. FIG. 16 is a view similar to FIG. 15 showing a modification in which the loading of the two main rubber bodies is adjustable.

*Trailer suspension—FIGS. 1–5*

In this form of the invention the light duty trailer frame 20 is illustrated as comprising a main longitudinal central beam 21 of square tubular form and butt welded at its rear end to the center of a main cross beam 22 which is also shown of square form in cross section. Diagonal channel braces 23 rigidly connect the outboard ends of the cross beam 22 with a forward part of the main longitudinal central frame beam 21.

The frame 20 is shown as supported at opposite sides by rubber tired wheels 25 each conventionally journalled on a stub axle 26 in any suitable manner (not shown), these stub axles extending horizontally transversely of the line of movement of the vehicle and the stub axles 26 at opposite sides of the vehicle being normally arranged axially in line with each other. Each stub axle 26 is welded or otherwise fixed to the end of an arm or lever 28 which can be of any suitable form but is shown as being of square tubular form in cross section with the stub axle 26 extending through its rear outboard end and being welded thereto. The inner end of each arm 28 is welded to the rear side of a hub member or cross shaft 29 of round tubular form in cross section, a strap 30 strengthening this connection between the arm 28 and its hub member 29 which extends from the top of the arm 28 around the front of the hub member 29 and thence rearwardly along the bottom of the arm 28 and being welded along its edges to these parts to securely and rigidly unite them together. Each round tubular hub member 29 extends horizontally transversely of the line of movement of the vehicle and is arranged parallel with its stub axle 26 and the axis of its wheel 25. Each hub member 29 is arranged directly under the cross frame beam 22 and extends from adjacent the center of this cross frame beam 22 to a point beyond the corresponding outboard end thereof, as shown in FIG. 2.

The inner and outer ends of each tubular hub member or cross shaft 29 are each journalled in a bearing 31 which is preferably in the form of a rubber bushed bearing. Each of these bearings is shown as comprising a rubber bushing 32 surrounded and held in compressive relation with the corresponding end of its tubular hub member or cross shaft 29 by upper and lower half bearing housings 33 and 34, these half bearing housings being drawn into compressive relation with the rubber bushing 32 by bolts 35. The ends of the rubber bushings 32 project beyond the half bearing housings 33, 34 and abut against abutment rings 36 welded to the companion hub member or cross shaft 29.

The upper half bearing housing 33 carries a pair of spaced vertical plates 38 welded to extend upwardly therefrom and the upper edges of these plates are welded to the underside of the cross frame beam 22 so that the wheels 25, stub axles 26, arms 28, hub members or cross shafts 29 and bearings 21 support the cross beam 22 of the frame 20.

The feature of the present invention resides in the manner 40 providing resilient resistance to the vertical movement of the wheels 25 with reference to the frame 20 and employing the rubber bodies in direct compression for this purpose. This structure 40 comprises a pair of identical S-shaped arms 41, welded as at 43, to the upper and lower sides of the hub member or cross shaft 29 and having tail pieces 42 welded to the channel-shaped outboard end of its companion arm 41, as indicated at 44.

One of the arms 41 has its channel 45 facing upwardly and engages, but is not fixed to the underside of a rubber block 46 is not vulcanized to the arm 41, and the upper engagement is a touching contact only, that is, the rubber block 46 is not vulcanized to the arm 41, and the upper end of the rubber block 46 is vulcanized to a top plate 48 carrying an upstanding stud bolt 49 by means of which it is secured to the bottom horizontal part of an L-shaped bracket 50 welded to the rear side of the cross frame beam 22.

The concave face 45 of the forwardly projecting arm 41 faces downwardly and has touching compressive engagement with the upper end of a resilient rubber block 46, the bottom of which is welded to a plate 48 having a downwardly projecting stud bolt 49 through which it is connected to the horizontal cross part 51 of a U-shaped bracket 52, the upstanding legs 53 of which are welded to the sides of an L-shaped bracket 54 welded to the front face of the frame cross beam 22. This L-shaped bracket 54 has a bottom part 55 to the bottom of which is secured a plate 56 by means of an upstanding stud bolt 58 and to the underside of this plate 56 is vulcanized a rubber body 59 which is adapted to engage the top of the front arm 41 and thereby serve to cushion rebound movement of the wheels 25 relative to the frame 20.

Operation—FIGS. 1–5

The direction of movement of the trailer is shown by the large arrows above FIGS. 1 and 3 and in operation the upward movement of one, say, of the front stub axles 26 effects corresponding upward movement of its arm 28 and clockwise movement of the tubular cross shaft 29 forming the tub of this arm, as viewed in FIGS. 4 and 5. This movement of the hub member 29 is permitted by the bushings 32 of the bearings 31 which are supported by opposite ends of the hub member. Since each bearing 31 is secured to the underside of the frame cross beam 22, it will be seen that the frame 20 is supported on the wheels 25 by means of a T-arm support provided by each arm 28 and its hub member 29, the bearings 31 for each of these hub members 29 being spaced widely enough apart to provide a stable support by the corresponding stub axle 26 and also being so located as to prevent cantilever or corner loading of these bearings.

This angular clockwise movement of each hub member 29, as viewed in FIGS. 4 and 5, effects a corresponding upward movement of the rearwardly projecting arm 41 and downward movement of the forwardly projecting corresponding arm 41 against their rubber bodies 46, as best shown in FIG. 4. These rubber bodies have frictional or touching engagement with these arms 45 but are placed in direct axial compression by these arms, the rear rubber body 46 being compressed upwardly against its L-shaped frame bracket 50 and the forward rubber body 46 being compressed downwardly against the bottom of its U-shaped bracket 51 supported by the L-shaped frame bracket 54.

The reverse or rebound movement of either wheel 25 is transmitted by its forwardly projecting arm 41, FIG. 4, to the bottom of the rebound rubber body 59 which serves to cushion such rebound movement.

It will be seen that this structure as illustrated in FIG. 4 provides a remarkably simple and effective means for providing resilient resistance for a vehicle spring suspension using rubber bodies in compression both for direct acting as well as rebound forces. It will also be seen that by having the arms 41 projecting diametrically opposite from each hub member 29, to which they are fixed, and by having each engage a rubber body 46 of substantially the same value of compressibility, the action of these rubber bodies 46 substantially balance or cancel out each other so far as effecting anything other than resistance to turning of the hub member 29, thereby to substantially eliminate radial forces of each hub member 29 against their bearings 31 as a consequence of the resilient resistance provided by these rubber bodies.

Auxiliary wheel suspension—FIGS. 6–9

A popular form of family travel involves the ownership of a light duty pickup truck on which a so-called camper body is placed, such body providing the living facilities for the family when traveling. When not traveling the pickup truck can serve its normal function. However, it has been found that the weight of the camper body places an excessive sustained load on the springs at the rear end of the pickup truck chassis.

The rear end of the pickup truck frame 60 is supported by a pair of conventional rear end truck suspension arms 62 through a conventional helical compression spring (not shown), the rear end of each arm 62 being pivotally connected as at 63 to a conventional axle bracket 64 at each end of the drive axle housing 65 for the rear wheels 66 of the truck, the drive axle being designated at 67. The present invention comprises a bracket 70 having its top wall 71 fixed to the underside of the plate of the truck chassis 60 by means of bolts 72 and having side walls 73 carrying a bottom wall 74 so as to provide a chamber 75 which is open at its front and rear ends. A cross pin 76 extends horizontally through and bridges the space between the side walls 73 and supports, within the chamber 75, a rubber bushing 78. This rubber bushing is compressed between a hub portion or cross shaft portion 79 formed by the central parts of a pair of plates 80 and which are secured together in compressive relation to the rubber bushing 78 by a series of bolts 81. These plates are identical and each is extended radially to provide a concave arm 82, the concave side 83 of one of which faces upwardly and the concave side 83 of the other of which faces downwardly. Each of these plates 80 is also formed with a tail piece 84 which forms a backup extension for the concave arm 82 of its companion plate 80. The upwardly opening concavity 83 bears against the underside of the bracket 70. The downwardly facing concavity 83 plate 86 secured by a series of bolts 88 to the top wall 71 of the bracket 70. The downwardly facing concavity 83 on the diametrically opposite side of the cross pin 76 bears compressively downwardly against the top of a rubber body 85 vulcanized to a base plate 86 secured to a series of bolts 88 to the bottom wall 74 of the bracket 70. Each rubber body 85, particularly in its unstressed state, is elongated vertically to have a vertical major axis along which the line of force is exerted, as hereinafter described, to expand the rubber body equally in opposite directions transversely of its major axis along a horizontal minor axis perpendicular to the major axis.

To the center part of the bottom of the tubular hub portion or cross shaft portion 79 of the lower plate 80 is secured, as by welds 89, the inboard end of an arm 90, this arm or lever also preferably being welded, as at 91, to the underside of the bottom tail piece 84. This arm has a knuckle 92 at its outboard end which embraces and compressively holds a flexible rubber bushing 93 in compressive relation to a pair of frusto-conical sleeves 94 which are held with their small ends in contact with each other by means of a bolt 95 extending therethrough. This bolt also holds the lower ends of a pair of shackles 96 against the outer ends of the frusto-conical sleeves 94 and the upper ends of these shackles 96 are pivotally secured by a bolt 98 to a riser 99 on the main rear end suspension arm 62. Desirably the pivotal connection between the bolt 98 and the riser 99 can be through a rubber bushing and a pair of frusto-conical portions as illustrated at the left of FIG. 7 but such pivotal connection forms no part of the present invention.

Operation—FIGS. 6–9

The auxiliary spring structure shown in FIGS. 6–9 can be applied to the rear end of a pickup truck so as to leave its standard helical compression springs (not shown) to accommodate the light or empty vehicle by means of the auxiliary arm 90 moving up and down in a free range. The auxiliary spring of the present invention should be set to come into action when the main vehicle springs (not shown) deflect one or two inches below the empty vehicle's static position. The auxiliary springs so coming into action stabilize the vehicle with a top heavy load, such as a camper body; relieve the main springs from an excessive load, and also provide added resilient resistance which is friction free.

Thus, when the auxiliary springs come into action the pickup truck chassis 60 moves downwardly sufficiently far so that the arm 90 is swung upwardly by the pair of shackles 96. This arm rotates the tubular hub portion or bearing housing 79 clockwise, as viewed in FIG. 8, about the cross pin 76, such movement being permitted by the rubber bushing 78, through the arms 80 which form a diametrically opposite extension of this tubular hub portion or bearing housing 79, this compresses the left hand rubber body 85 upwardly and the right hand rubber body 85 downwardly, the dead ends of these rubber bodies being fixed to the truck frame 60 through the bracket 70. Accordingly, the resistance of these rubber bodies 85 acted upon in direct compression, is added to the resilient resistance provided by the conventional helical compression springs (not shown) for the rear end of the truck frame.

Dolly—FIGS. 10–15

The forward end of the family trailer is usually hitched to the rear bumper of the family automobile through a ball-and-socket joint (not shown) and, depending upon the fore-and-aft balance of the trailer, impresses a vertical load on the rear of the automobile which can change and adversely affect its driving characteristics. In FIGS. 10–15 is illustrated a self-steering dolly wheel which supports the front end of the family trailer so attached to the family automobile to overcome this objection.

The front end of the trailer frame 100 is shown as comprising conventional horizontal side channels or beams 101 which are joined together at their front ends and diverge rearwardly. A tongue or horizontal bar 102 is secured to and projects forwardly from the joined front ends of these frame bars 101 and at its front end carries the conventional hitch (not shown) by means of which the trailer is attached to trail the family car.

The rubber tired wheel of the dolly is indicated at 103 and is conventionally journalled on a stub axle 104 in any suitable manner (not shown), this stub axle extending horizontally transversely of the line of movement of the vehicle. The stub axle is welded or otherwise fixed to the end of an arm 105 which is shown as being of square tubular form in cross section with the stub axle 104 extending through its rear outboard end and being welded thereto. The inner end of each arm 105 is welded to the rear side of a hub member or cross shaft 106 in the form of a horizontal cylindrical rod extending parallel with the stub axle 104 and projecting from the same side of the arm 105. Similar to the stub axle 104 this hub member or cross shaft 106 extends through the arm or lever 105 and is welded thereto.

The opposite ends of the hub member or cross shaft 106 are journalled in bearings 108 each of which is preferably in the form of a rubber bushed bearing shown as comprising a rubber bushing 109 surrounded and held in compressive relation with the corresponding end of its hub member or cross shaft 106 by upper and lower half bearing housings 110 and 111, these half bearing housings being drawn into compressive relation with the rubber bushings by bolts 112, as best shown in FIG. 14. The ends of the rubber bushings 109 project beyond the half bearing housings 110, 111 and abut against abutment rings 113 welded to the hub member or cross shaft 106, as best shown in FIG. 13.

To each of the upper half bearing housings 110 is welded, as indicated at 114, a horizontal plate 115 which is in the form of a slide mounted in a frame pocket member 118 so as to be capable of sliding movement lengthwise of the line of travel of the trailer. To this end each frame pocket member 118 is welded at its front end to a L-shaped frame bracket 120 and at its rear end to a L-shaped frame bracket 121, each pair of these L-shaped frame brackets 120, 121 being welded to the underside of a companion frame bar 101 in fore-and-aft spaced relation to each other, with reference to the line of travel of the trailer. Each pocket member 118 comprises a flat top plate 122 against the underside of which the slide 115 bears and moves, such movement being permitted by the spacing of the front and rear walls 123, 124 of the pocket member 118 being spaced from each other a greater distance than the fore-and-aft length of the slide 115, as best shown in FIG. 14. Transverse movement of each slide plate 115 is prevented by side walls 123–126, best illustrated in FIG. 13, and this slide is prevented from dropping out of the pocket 127 provided by these walls 125, 126 by horizontal bottom flanges 128 formed at the bottom of the end walls 123, 124 in opposing relation to each other.

The resilient resistance to vertical movement of the dolly wheel 103 relative to the frame 100 is provided with by means of a structure quite similar to that illustrated in FIGS. 1–5, except that the compressive action against the rubber bodies is in a horizontal direction rather than in a vertical direction. Thus, between the bearings 108, a pair of S-shaped arms 130 is welded, as at 131, to the fore-and-aft sides of the cross shaft or hub member 106 to project, respectively, upwardly and downwardly therefrom and having their tail pieces 132 welded to the channel-shaped outboard end of its companion arm 130, as indicated at 133. The upper arm 130 has its channel 135 facing forwardly and engages but is not fixed to the rear side of a rubber block 146 in line with the horizontal axis of this block. This engagement is in touching contact only, that is, the rubber block 146 is not vulcanized to the upper arm 130, and to the forward end of this rubber block 146 is vulcanized a front plate 148 carrying forwardly projecting stud bolts 149 by means of which it is secured to the vertical part of the L-shaped frame bracket 120 welded to the underside of the bottom flange of the corresponding side frame channel or beam 101, as previously described.

The concave face 135 of the downwardly projecting arm 130 faces rearwardly and has touching compressive frictional engagement with the forward end of a resilient rubber block 146, the rear end of which is welded to a plate 148 having rearwardly projecting stud bolts 149 through which it is connected to the bottom end of a depending channel 150 welded to project downwardly from the companion frame bracket 121 which, as previously described, is welded to the underside of a companion side channel or frame beam 101. The two slides 115 supported in the slide pockets 127 at opposite ends of the hub member or cross shaft 106 permit a limited steering movement of the dolly wheel 103, this steering movement being in the order of about 5° in either direction from a normal straight ahead position as illustrated by the dot-dash lines B with reference to the straight ahead dot-dash line A in FIG. 11. This steering is necessary because the dolly wheel engages the ground between the family touring car and the main wheels (not shown) carrying the trailer and hence the dolly wheel 103 would be subject to tire scuffing if not permitted to have a caster or self-steering movement. It is desirable, however, that this self-steering or caster movement be stabilized and to this end a shock absorber 155 is provided to act horizontally against the arm 105, transversely of the line of movement of the vehicle, so that the dolly wheel 103 cannot hop around from side to side, such as when leaving contact with the ground under rebound forces. This shock absorber is shown as being of the double acting hydraulic telescopic type having an outer telescoping member 156 secured to a frame bracket 158 which is secured to and depends from one of the side beams or channels 101 and having an inner telescoping member 159 secured to a bracket 160 fixed to and rising from the outboard end of the arm 105.

Operation—FIGS. 10–15

It will be assumed that the tongue or forwardly projecting bar 102 of the frame 100 of the trailer is secured by a conventional articulated or ball-and-socket joint (not shown) to the rear of the family automobile (not shown) and that the rear end of this frame is supported by single or tandem axle main supporting wheels (also not shown). The weight of the forward end 102 of the trailer is yieldingly supported essentially by the dolly wheel 103 through the friction free rubber bodies 146 which act in direct compression to provide such resiliency. Thus the upward pressure of the ground against the dolly wheel 103 in providing such support is transmitted through the stub axle 104 and arm 105 so as to bias the hub member or cross shaft 106 of this arm in a clockwise direction as viewed in FIGS. 14 and 15, such biasing being permitted by the rubber bushed bearings 108 which support the trailer frame 100 on the opposite ends of this cross shaft or hub member 106. The S-shaped arms 130 fixed to and projecting vertically in diametrically opposite directions from this cross shaft or hub member 106 transmit this pressure compressively against the live ends of the horizontal rubber blocks 146 the opposite or dead sides of which are secured to the frame brackets 120, 150. Accordingly the upward pressure of the dolly wheel 103 serves to compress these rubber bodies 146 equally and horizontally to a corresponding degree and thereby provide a resilient support for the front end of the trailer frame upon the dolly wheel 103.

Since, in rounding a curve, the wheels of the family automobile (not shown) turn in one direction while the main wheels (not shown) for the trailer tend to continue straight ahead, to avoid tire scuffing it is necessary that the dolly wheel 103 swivel or be self-steering. This characteristic, illustrated by the dot-dash lines B—B in reference to a straight ahead steering line A in FIG. 11, is permitted by the slide plates 115 supported by opposite ends of the hub member or cross shaft 106. Thus, as the wheel 103 is urged to one side or the other, to avoid tire scuffing, the sliding plate 115 at one side of the cross shaft or hub member 106 moves forwardly in its pocket 127 while the opposite slide plate 115 moves rearwardly. As soon as the turn has been negotiated the forces of the ground against the tire of the wheel 103, again to avoid tire scuffing, bring the wheel back to the straight ahead position A illustrated in FIG. 11.

To stabilize such self-steering action, such as under rebound forces when the wheel 103 bounds upwardly out of contact with the roadway, a double acting hydraulic shock absorber 155 is provided which acts horizontally and transversely against the dolly wheel arm 105 and tends to hold the dolly wheel in any position to which it has been brought preparatory to being moved to another position in response to a change in direction of the towing automobile.

A number of factors determine the proper characteristics of a dolly so supporting the front end of a travel trailer, especially with a standard ball-and-socket hitch connecting the trailer to the rear end of the frame of the tow car, as is most desirable in towing at high speed or over rough terrain.

Essentially the suspension for the dolly wheel 103 must be deep and soft, that is, its spring rate should be as low as practicable so that as the suspension springs 146 are compressed from static they provide a minimum increase in their rate of resilient resistance. Also the permitted vertical wheel movement should be as great as is practicable. The reason for such deep and soft suspension characteristics for dolly wheels is that when the rear wheels of the tow car go into a road depression with the trailer and dolly wheels on the level, the front end of the trailer will be pulled down closer to the ground and a disproportionate load will be placed on the dolly wheel 103 unless a liberal amplitude of movement and soft resilience is provided by the dolly wheel suspension. With such liberal amplitude and soft resilience, the increased load on the dolly wheel is not serious. The converse obtains, if the tow car or main trailer wheels are lifted, as in going over an undulation such as a railroad track. The dolly wheel 103 would be completely unloaded if the suspension did not provide a large amplitude of vertical movement. In order to provide such large amplitude of movement in the suspension with compressed rubber springs, as obtains with all forms of the invention shown, the rubber springs are placed close to the hub or cross shaft of the lever or arm they control so that the free end of the lever or arm has many times the vertical deflection of the rubber bodies. With the rubber bodies close to the hub or cross shaft, it is important that they neutralize or counteract each other so far as excessive corner loading of the bearings for the hub or cross shaft is concerned. This is done by arranging them in pairs to act against diametrically opposite sides of the hub or cross shaft.

The 5 or so degrees of self-steering of the dolly wheel 103 will accommodate all forward turning movements except for a slow speed very sharp turn. The tire mileage is increased many times by the provision of such self-steering and consequent reduction of tire scuffing.

Dolly—FIG. 16

The form of the dolly shown in FIG. 16 is identical with that shown in FIGS. 10–15 except that in addition means are provided for increasing and decreasing the load impressed on the two rubber bodies which supply the resilient resistance. Accordingly the numerals employed in FIGS. 10–15 have been applied to the same parts in FIG. 16 and the description of their construction and operation will not be repeated.

However, to the rearward sides of the arms 130 is welded an upstanding arm 160 which, for strength, can be flanged, as indicated at 161. The upper end of this arm 160 is formed to provide an ear 162 extending transversely of the line of movement of the vehicle and provided with an aperture 163. This aperture and ear project above the trailer frame 100 and a horizontal rod 164 projects through the aperture 163.

This rod extends lengthwise of the line of travel of the dolly and its unthreaded rear end is slidingly mounted in a bearing 165 contained in a cross bar 166 which forms part of the frame 100. The opposite end of the rod 164 is threaded, as indicated at 168, and works in a nut 169 fixedly mounted in another cross bar 170 which forms part of the frame 100. The threads 168 can be provided with a lock nut 171 and the rod can be turned by a wrench (not shown) applied to its squared end 172.

Pinned to the rod 164 between the ear 162 and nut 169 is a head 173 carrying a resilient rubber body 174 arranged to engage the forward face of the ear 162. Pinned to the rod 164 between the ear 162 and the bearing bushing 165 is a head 175 carrying a resilient rubber body 176.

The square end 172 of the shaft 164 is turned as by a ratchet wrench (not shown) to either load or unload the main rubber bodies 146. For example, if it is desired to jack up the front end of the trailer for the purpose of either coupling or uncoupling it to the tow car (not shown), a wrench would be applied to the square end 172 of the shaft 164 and the shaft would be turned so as to force the rubber body 174 into engagement with the ear 162 and thereby add the pressure of this rubber body 164 to the two rubber blocks 146. This increases the downward pressure of the arm 105 against the stub axle 104 thereby to raise the frame 100 and elevate the front end of the trailer (not shown) so as to assist in coupling or uncoupling it from the tow car.

Conversely, if more traction were desired from the drive wheel of the tow car, the head end 172 of the rod could be turned the other way so as to force the rubber body 176 into engagement with the ear 162 and unload the rubber bodies 146 so as to lift the arm 105 and relieve the downward pressure against the dolly wheel 103. Such would, of course, transfer more weight of the trailer onto the rear of the tow car and hence increase the pressure on the rear traction wheels of the tow car.

By "rubber" as used in the accompanying claims is meant natural rubber, synthetic rubber or mixture of natural and synthetic rubber.

I claim:

1. A vehicle spring suspension adapted to be interposed between a frame structure and a base structure and having a hub member, means mounting said hub member on one of said structures for oscillation relative thereto, a first arm fixed to said hub member and projecting laterally therefrom, and means connecting the outboard end of said first arm to the other of said structures, wherein the improvement comprises a plurality of second arms fixed at their inbord ends to said hub member to project outwardly therefrom in circumferentially spaced relation to one another, the outboard end of each of said second arms being formed to provide a seat spaced from said hub member and said seats facing in the same circumferential direction, a plurality of brackets fixed to said other of said structures and each having a seat arranged in the path of and in direct opposition to the seat of a companion arm, and an elongated rubber body having, in its unstressed state, a major axis extending lengthwise thereof and a minor axis extending perpendicularly to said major axis and said rubber body being substantially symmetrical on opposite sides of said major axis along said minor axis, said rubber body being spaced from said hub member and being positioned to compressively engage said seat of its second arm at one end of its major axis and to compressively engage said seat of its bracket at the opposite end of its major axis, said rubber body being thereby compressed between each companion pair of seats of said second arms and brackets through a line of force along its said major axis throughout the range of movement of the suspension, said rubber bodies being so compressed substantially exclusively between their said companion pairs of seats without substantial forces other than along their major axes, and said opposite sides thereof being free to expand and contract substantially equally in opposite directions transversely of their major axes and such transverse expansion and contraction providing substantially the entire resiliency, acting substantially exclusively in response to direct compression of said rubber bodies along their major axes, in supporting said frame structure on said base structure, the forces of said second arms against said rubber bodies along their said major axes at least in part counterbalancing one another to reduce radial forces of said hub member against its said mounting means as a consequence of the resilient resistance in compression provided by said rubber bodies.

2. A vehicle spring suspension as set forth in claim 1 wherein each rubber body so interposed between each of said companion pair of seats of said second arms and the corresponding bracket is fixed to one such seat and has only touching pressure contact with the other.

3. A vehicle spring suspension as set forth in claim 1 wherein said means mounting said hub member on said one of said structures comprises first and second bearings spacedly fixed to said one of said structures and pivotally supporting opposite ends of said hub member, and wherein said first arm is fixed to said hub member between said first and second bearings thereby to proportion the load upon said first and second bearings in accordance with the spacing of said first arm therefrom.

4. A vehicle spring suspension as set forth in claim 1 additionally including a rebound resilient compression rubber member mounted on said one of said structures in opposition to one of said rubber bodies with one of said second arms being operatively interposed between said rebound resilient rubber member and its opposing rubber body.

5. A vehicle spring suspension as set forth in claim 1 wherein said plurality of said second arms are a pair projecting generally radially from said hub member in substantially opposite directions, and jointly comprise a pair of S-shaped members embracing and fixed intermediate their ends to said hub member and each having a curved outboard end, and a tail piece forming an inboard end of each S-shaped member fixed relative to the outboard end of the other S-shaped member, the concave side of each curved outboard end contacting its resilient rubber body over a substantial bearing area of the latter.

6. A vehicle spring suspension as set forth in claim 1 wherein said hub member and said plurality of second arms jointly comprise a pair of metal members each having an outboard end and an inboard end, said inboard ends jointly forming a tube providing said hub member, and means joining said metal members together.

7. A vehicle spring suspension as set forth in claim 1 wherein said hub member comprises the inboard ends of said second pair of arms jointly formed to provide a tube embracing a bearing carried by a pin fixed to said one of said members, and means securing said inboard ends of said second pair of arms together.

8. A vehicle spring suspension as set forth in claim 7 wherein said first arm is so fixed to said hub member by a weld connecting its inboard end to one only of said second arms.

9. A vehicle spring suspension as set forth in claim 1 wherein said frame member is a vehicle frame and said base member is a rubber tired road engaging wheel and said pivotally connecting means is an axle for said wheel and projecting from the rear end of said first arm, and wherein said journaling means includes a slide joint permitting oscillation of the rear end of said first arm about a vertical axis to permit said wheel to swivel and be self steering.

10. A vehicle spring suspension as set forth in claim 9 wherein said journaling means comprise a bearing and bearing housing embracing each end of said hub member on opposite sides of said first arm, and said slide joint comprises a horizontal plate fast to the top of each bearing housing and housed for horizontal sliding movement, lengthwise of the line of travel of the vehicle, in the downwardly opening pocket of a pocket member fixed to said frame member.

References Cited

UNITED STATES PATENTS

| 2,861,796 | 11/1958 | Rohr | 267—21 |
| 2,729,442 | 1/1956 | Neidhart | 267—21 |
| 2,712,742 | 7/1955 | Neidhart | 267—21 X |
| 2,553,188 | 5/1951 | Grube | 267—21 |

FOREIGN PATENTS

| 730,534 | 5/1955 | Great Britain. |
| 1,319,290 | 1/1963 | France. |

PHILIP GOODMAN, *Primary Examiner.*

U.S. Cl. X.R.

267—21